(12) United States Patent
Griessen et al.

(10) Patent No.: US 8,474,177 B2
(45) Date of Patent: Jul. 2, 2013

(54) REFLECTING DEVICE, SOLAR COLLECTOR, PITCHED ROOF PROVIDED WITH A SOLAR COLLECTOR OF THIS TYPE, AND GREENHOUSE

(75) Inventors: Ronald Pierre Griessen, Kortenhoef (NL); Marinus Johannes Slaman, Waddinxveen (NL)

(73) Assignee: Vereniging Vu-Windesheim (NL)

( * ) Notice: Subject to any disclaimer, the term of this patent is extended or adjusted under 35 U.S.C. 154(b) by 373 days.

(21) Appl. No.: 12/866,724

(22) PCT Filed: Feb. 9, 2009

(86) PCT No.: PCT/NL2009/050056
§ 371 (c)(1),
(2), (4) Date: Nov. 11, 2010

(87) PCT Pub. No.: WO2009/099331
PCT Pub. Date: Aug. 13, 2009

(65) Prior Publication Data
US 2011/0047869 A1    Mar. 3, 2011

(30) Foreign Application Priority Data

Feb. 8, 2008  (NL) ..................................... 2001271
Aug. 22, 2008 (NL) ..................................... 2001908

(51) Int. Cl.
*A01G 9/14*        (2006.01)
(52) U.S. Cl.
USPC ............................................................ 47/17
(58) Field of Classification Search
USPC ............................................. 47/17; 126/698
See application file for complete search history.

(56) References Cited

U.S. PATENT DOCUMENTS

| | | | |
|---|---|---|---|
| 583,594 A * | 6/1897 | Ewen ............................. | 359/593 |
| 593,045 A * | 11/1897 | Cummings .................... | 359/594 |
| 2,783,682 A | 3/1957 | Swenson | |
| 4,056,094 A | 11/1977 | Rosenberg | |
| 4,077,393 A * | 3/1978 | Mattson ......................... | 126/709 |
| 4,137,899 A * | 2/1979 | Weslow ......................... | 126/649 |

(Continued)

FOREIGN PATENT DOCUMENTS

| | | | |
|---|---|---|---|
| DE | 3634213 A1 * | 4/1988 | |
| DE | 102004032357 | 2/2006 | |

(Continued)

*Primary Examiner* — Frank T Palo (57) ABSTRACT

Reflecting device (1) for adjustably reflecting light, such as sunlight, comprising a transparent first wall (3), a transparent second wall (40), which is arranged substantially parallel to and at a distance from the first wall (3), and a regulating layer (7), which is provided with a duct (10), which is bounded between the first wall (3) and the second wall (40), and which regulating layer (7) substantially allows light which impinges on the first wall (3) through to the second wall (40) if the duct (10) is filled with a transparent liquid (9) and reflects light which impinges on the first wall (3) if the duct (10) is empty, the regulating layer (7) being provided with a structure (11) which is prismatic in cross section, characterized in that, the reflecting device is provided with a third wall (41), which is arranged substantially parallel to and at a distance from the second wall (40), and a second regulating layer (7'), which is provided with a second duct (10'), which is bounded between the second wall (40) and the third wall (41), the second regulating layer (7') being provided with a second structure (12) which is prismatic in cross section.

25 Claims, 6 Drawing Sheets

U.S. PATENT DOCUMENTS

| | | | |
|---|---|---|---|
| 4,148,563 A | 4/1979 | Herbert | |
| 4,270,517 A | 6/1981 | Stephens | |
| 4,368,725 A | 1/1983 | McClintock | |
| 4,586,489 A | 5/1986 | Voll | |
| 4,612,913 A * | 9/1986 | Mori | 126/606 |
| 5,645,045 A * | 7/1997 | Breslin | 126/669 |
| 6,304,365 B1 | 10/2001 | Whitehead | |
| 2008/0219010 A1 | 9/2008 | Oyama | |
| 2009/0013992 A1 * | 1/2009 | Sonneveld | 126/705 |
| 2010/0199577 A1 * | 8/2010 | Sonneveld | 52/173.3 |
| 2011/0047869 A1 * | 3/2011 | Griessen et al. | 47/17 |

FOREIGN PATENT DOCUMENTS

| | | |
|---|---|---|
| FR | 2420085 | 10/1979 |
| WO | 00/10048 | 2/2000 |
| WO | 00/75720 | 12/2000 |
| WO | 2005/066552 | 7/2005 |

\* cited by examiner

REFLECTING DEVICE, SOLAR COLLECTOR, PITCHED ROOF PROVIDED WITH A SOLAR COLLECTOR OF THIS TYPE, AND GREENHOUSE

The invention relates to a reflecting device for optionally adjustably reflecting light, such as sunlight.

U.S. Pat. No. 4,270,517 discloses a solar collector which switches off automatically when a maximum temperature is exceeded. The solar collector comprises a frame having a base and upwardly extending side walls, which are covered by a transparent cover plate. On the base a photoreceptor with a surface which absorbs solar energy is arranged. Between the absorbing surface and the cover plate, there is an optical scattering layer and a transparent liquid with a refractive index which is approximately equal to the refractive index of the scattering layer. In the presence of transparent liquid, the scattering layer allows sunlight which falls on the cover plate to pass through. If the temperature of the solar collector rises above the evaporating temperature of the liquid, the liquid evaporates. A portion of the sunlight is then reflected by the scattering layer, resulting in a decrease in the temperature of the solar collector.

However, when there is a considerable amount of incident solar energy, the scattering layer is not sufficiently effective. As a result thereof, there is a risk that the solar collector will reach the stagnation temperature, that is to say the heat absorption of the solar collector as a result of incident sunlight is greater than the heat removal of the solar collector, so that the temperature of the solar collector and/or of components thereof rises until overheating occurs. In this case, the solar collector and/or the components thereof may become damaged.

U.S. Pat. No. 4,056,094 discloses a solar collector which is provided with a transparent panel and an absorbing plate, which are arranged essentially parallel to one another and at a distance from one another. Between the transparent panel and the absorbing plate, there is a duct. The bottom surface of the transparent panel has a structure which is prismatic in cross section. When liquid is present in the duct, the sunlight incident on the transparent panel passes through onto the absorbing plate. When a gas is present in the duct, the sunlight is reflected. However, it is a drawback that the reflection of sunlight depends on the time of day. Although the sunlight is reflected efficiently at 12 o'clock (noon), there is a risk, especially early in the morning and late in the afternoon, that insufficient sunlight can be reflected. At those times of day, the rays of light from the sun are incident at an angle and pass through to the absorbent plate despite the presence of gas in the duct.

U.S. Pat. No. 4,148,563 discloses a reflective panel which can be used, for example, with solar collectors and greenhouses. The reflective panel comprises two layers of transparent material. The outer surfaces of the reflective panel are flat, while the inner surfaces of the two layers are provided with mating structures which are prismatic in cross section. If a vapour is present between the layers, the layers are at a distance from one another and the light incident on the reflective panel is reflected. Upon cooling, the vapour condenses and a vacuum is created which pulls the two layers towards one another. Between the two layers, a thin film of liquid is present, so that the light incident on the reflective panel passes through the two layers. A drawback of this reflective panel is that light is badly reflected when it does not fall onto the reflective panel perpendicularly or not virtually perpendicularly. In addition, for the reflective panel to work, the layers have to be matched to one another accurately. Furthermore, the two layers of the reflective panel are moving parts, which adversely affects the reliability.

It is an object of the invention to provide an improved reflecting device.

This object is achieved according to the invention by means of the reflecting device according to claim 1. The transparent first wall and the transparent second wall are arranged substantially parallel to one another and at a distance from one another. The first duct is arranged between the two transparent walls, that is to say the first duct is bounded between said walls. The transparent second wall and the third wall are also arranged substantially parallel to one another and at a distance from one another. The second duct is arranged between the second and the third wall. The first structure, which is prismatic in cross section, forms a boundary surface of the first duct, that is to say said structure is provided on the first or second wall. The prismatic cross-sectional first structure is for example provided on the transparent first wall, on that side thereof which is turned towards the second wall. The first duct then extends between the prismatic cross-sectional first structure of the transparent first wall and the transparent second wall. The prismatic cross-sectional second structure forms a boundary surface of the second duct, that is to say said structure is provided on the second or third wall. The prismatic cross-sectional second structure is for example provided on the transparent second wall on that side thereof which is turned towards the third wall. The second duct then extends between the prismatic cross-sectional second structure of the transparent second wall and the third wall.

The prismatic cross-sectional first and second structures thus extend in two planes which are substantially parallel to one another. If, due to the angle of incidence, light passes through the prismatic cross-sectional first structure of the first regulating layer, the prismatic cross-sectional second structure of the second regulating layer can still reflect this light which has passed through. In other words, two prismatic structures have been arranged one above the other. When light passes through the upper prismatic structure, the angle of incidence changes. The lower prismatic structure may refract the light rays which have passed through the upper prismatic structure. As a result thereof, the reflective properties of the reflecting device according to the invention are significantly improved when the incident light rays are at an angle.

When it is used to reflect sunlight, the reflecting device is thus effective throughout the day and not just around 12 o'clock (noon). However, the reflecting device according to the invention can also be used to counteract light pollution emanating from a greenhouse. The light coming from the lighting fixtures which are provided in the greenhouse will impinge on the roof structure of a greenhouse substantially obliquely from the inside. The efficiency of the reflecting device is significantly increased by the use of two prismatic structures arranged one above the other, so that such light pollution can be reduced.

Incidentally, the first regulating layer and the second regulating layer can also be seen as two partial layers of a single regulating layer of the reflecting device. The regulating layer of the reflecting device in this case comprises two partial layers, which are arranged adjacent to one another, and in which the partial layers are provided with a first structure and a second structure, respectively, each of which being prismatic in cross section. The first structure and the second structure of the partial layers can in this case each be turned to the third wall, which, for example, is in the form of an absorbing layer. The prismatic structure of the first partial layer is in this case arranged at a distance from the third wall in order to form a first duct in between, and the prismatic second structure of the second partial layer is arranged at a distance from the first partial layer in order to form a second duct in between.

In a moderate climate, it is desirable to regulate the reflection of sunlight by the reflecting device. The first regulating layer substantially allows light which impinges on the first wall through to the second wall if the duct is filled with a transparent liquid and reflects light incident on the first wall when the duct is empty. The second regulating layer substantially allows light which impinges on the second wall through to the third wall if the second duct is filled with a transparent liquid and reflects light incident on the second wall when the second duct is empty.

The reflection of sunlight on the reflecting device can be regulated by means of the prismatic cross-sectional first and second structures together with the transparent liquid, for example water or alcohol. Each structure has projections which are prismatic in cross section. If the prismatic cross-sectional first structure is in contact with the transparent liquid, this structure allows light from the transparent first wall to substantially pass through to the second wall. If the prismatic cross-sectional first structure is adjacent to a vacuum, vapour or gas, such as air, that is to say the duct is empty, light which impinges from the transparent first wall is substantially reflected. The action of the prismatic cross-sectional second structure is identical. Two regulating layers are formed one above the other which can allow light through or reflect light, depending on the presence of liquid or gas.

It has been found that such a prismatic structure can reflect light particularly effectively, since light rays which impinge at right angles lead to so-called "total reflection". When light rays impinge at an angle, the light may, as a result of the angle of incidence, pass through the prismatic cross-sectional first structure of the first regulating layer, but the prismatic cross-sectional second structure of the second regulating layer can still reflect this light which has passed through.

When used as an adjustable reflecting device, the first duct and/or the second duct are provided with a transparent liquid which is in contact with the structure being prismatic in cross-section for substantially allowing light through the first and second regulating layer, respectively, in which the transparent liquid can evaporate from the first and second duct, respectively, through heating for substantially reflecting light by the structure being prismatic in cross-section of said regulating layer.

If the prismatic structure is filled with the transparent liquid, light which falls on the transparent first wall is allowed through by the regulating layer substantially unimpeded. This causes the transparent liquid to heat up. If the temperature rises above a threshold value, evaporation of the transparent liquid occurs. The prismatic structure is then no longer adjacent to the transparent liquid, so that the incident light rays are reflected against the surfaces of the prismatic cross-sectional structure. As a result thereof, the reflecting device makes intrinsic protection against overheating possible.

Optionally, the reflective properties of the reflecting device can be adjusted by actively removing or introducing the transparent liquid. In this case, the reflecting device not only offers an intrinsic protection, but the reflecting device can be controlled.

Incidentally, it does not necessarily have to be possible for the duct to be filled with transparent liquid during use. In a hot climate, for example near the equator, the duct can remain empty continually. The reflecting device then constantly reflects as much sunlight as possible.

In one embodiment, the first structure being prismatic in cross-section delimits the first duct on a side of the first duct which extends parallel to the first wall and second wall. For example the prismatic first structure, that is to say the prismatic surface of the structure, is turned towards the second wall and arranged at a distance therefrom, in which the duct is formed between the prismatic first structure and the second wall.

In this case, it is also possible for the second structure being prismatic in cross-section to delimit the second duct on a side of the second duct which extends parallel to the second wall and third wall. The second structure being prismatic in cross-section is, for example, provided on the second wall, on that side thereof which is turned towards the third wall. Instead, the second structure being prismatic in cross-section may be provided on the third wall, on that side thereof which is turned towards the second wall. The location of the second structure depends on which side the incident light comes from and has to be reflected.

In one embodiment, the first wall and the second wall and the third wall are fixed with respect to one another. The walls of the reflecting device are at a fixed distance from one another. Said fixed distance determines the dimensions of the first and second ducts. The reflecting device is rigid and has no moving parts, which promotes reliability.

In one embodiment, the third wall is provided with an absorbing layer. As a result thereof, the reflecting device is adapted for use with a solar collector. Incident sunlight is allowed through to the absorbing layer of the third wall if transparent liquid is present in the ducts. The absorbed solar energy can be used effectively. Without transparent liquid in the ducts, incident sunlight is reflected against the surfaces of the structures being prismatic in cross-section. By evaporation of the liquid, the solar collector is intrinsically protected against overheating and the risk of stagnation is reduced. The liquid can also be removed actively in order to modify the reflective properties of the solar collector.

In one embodiment, the third wall is transparent. As a result thereof, the reflecting device is, for example, suitable for integration into the roof structure of a greenhouse. Without transparent liquid in the ducts, the roof construction allows little, if any, sunlight through. This may be desirable, for example, in order to prevent the plants in the greenhouse from becoming burnt. If the ducts are filled with liquid, sunlight passes through substantially unimpeded. Incidentally, the reflecting device can also be used to prevent light from emerging from the greenhouse by turning the prismatic structures round. This reduces the light pollution produced by a greenhouse.

It is possible that the transparent first wall has an upper surface which is turned towards the light, in which the upper surface is substantially flat. If the light falls onto the upper surface at right angles, for example at approximately 12 o'clock (noon) in the case of sunlight, the light passes through to the second wall. If no transparent liquid is present in the prismatic structure, for example as a result of evaporation or otherwise, the light rays are reflected substantially completely.

The prismatic cross-sectional first structure and the prismatic cross-sectional second structure can each be designed in different ways. The first structure and/or the second structure may, for example, be provided with pyramid-shaped or conical projections, elongate ridges or other shapes, which are prismatic in cross section.

The ridges or other shapes of the prismatic structure may be connected to the second wall via dividing walls. The dividing walls extend in the longitudinal direction of the ridges. The dividing walls not only provide structural strength, but also form partial ducts for the transparent liquid. Between the ridge or several ridges, the opposite wall and two dividing walls, in each case one partial duct is formed. The adjoining partial ducts together form the first or second duct. This is advantageous for the flow of liquid.

When using several regulating layers, the ridges of the regulating layers may each comprise a tip, the tips of the ridges of the first structure being aligned with respect to the tips of the ridges of the second structure. Alternatively, the ridges of the regulating layers may each comprise a tip, with the tips of the ridges of the first structure being offset with respect to the tips of the ridges of the second structure. In a particular embodiment, the tips of the ridges of the first structure are substantially in the centre between the tips of the second structure. As a result, the degree of reflection of sunlight is relatively high when no liquid is present, even when the light rays impinge at an angle.

In one embodiment, the ridges of the first structure and the ridges of the second structure extend at an angle to one another. By adjusting this angle, the reflective properties of the reflecting device when light impinges can be modified. For example, the ridges of the first structure of the first regulating layer extend substantially at right angles with respect to the ridges of the second structure of the second regulating layer.

In one embodiment, the transparent first wall comprises a cover plate and a carrier plate, which are arranged at a distance from one another in order to form an insulating layer. The cover plate, for example, forms the outer side of the reflecting device, onto which light impinges. The cover plate is situated at a distance above the carrier plate of the first wall, which is connected to the upper surface of the adjoining regulating layer. Between the cover plate and the carrier plate, there is an intermediate space which is filled with air or contains a vacuum. This intermediate space ensures that little, if any, convection can occur—the intermediate space forms an insulating layer. As a result thereof, heat losses are reduced.

The transparent first wall and/or the transparent second wall and/or the third wall and/or the first regulating layer and/or the second regulating layer may comprise plastic, for example polycarbonate. Due to the intrinsic protection against high temperatures, relatively inexpensive plastics may be used.

For example, the transparent first layer and/or the transparent second layer and/or the regulating layer are extruded. These layers can also be integrally formed by co-extrusion. Producing a single panel, in which the transparent layers, the regulating layer and the absorbing layer are integrated, is relatively inexpensive. However, the prismatic structure can also be of a different design—for example the prismatic structure may be formed by a film/foil layer.

The thickness of the regulating layer is determined by the height of the structure or structures arranged above one another. The height of each structure is, for example, between 10 μm and 5 mm. If the structure is formed by a film/foil which is arranged in the regulating layer, the height thereof may be in the order of magnitude of μm. When the plastic regulating layer is extruded, the height of each structure is, for example, 2 or 3 mm.

The invention also relates to a solar collector for converting solar energy into heat, comprising a reflecting device as described above. In particular, the solar collector comprises a transparent first wall, a transparent second wall, and a third wall which is provided with a solar energy-absorbing layer, which second wall is arranged substantially parallel to and at a distance from the first wall, the solar collector being provided with a first regulating layer, which is provided with a first duct, which is bounded between the first wall and the second wall, and which first regulating layer substantially allows light which impinges on the first wall through to the second wall when the first duct is filled with a transparent liquid and reflects light which impinges on the first wall when the first duct is empty, the first regulating layer being provided with a first structure which is prismatic in cross section.

According to the invention, the third wall is arranged substantially parallel to and at a distance from the second wall, and the solar collector is provided with a second regulating layer, which is provided with a second duct, which is bounded between the second wall and the third wall, the second regulating layer substantially allowing light impinging on the second wall through to the third wall if the second duct is filled with a transparent liquid and reflecting light impinging on the second wall if the second duct is empty, the second regulating layer being provided with a second structure which is prismatic in cross section.

In this case, the first structure may delimit the first duct on a side of the first duct which extends parallel to the first wall and second wall. The second structure may delimit the second duct on a side of the second duct which extends parallel to the second wall and the third wall. For example, the first structure is provided on the first wall, on that side thereof which is turned towards the second wall, and the second structure is provided on the second wall on that side thereof which is turned towards the third wall.

As long as the prismatic structures of the regulating layers of the solar collector are filled with transparent liquid, the regulating layers allow the sunlight through to the absorbing layer of the third wall. The solar collector heats up on account of the incident sunlight. If the temperature has increased to such a degree that the transparent liquid evaporates, each of the prismatic structures forms a reflecting surface for the incident sunlight. As a result thereof, the solar collector is intrinsically protected against overheating. If desired, the solar collector can be designed such that the transparent liquid can be removed by the action of an operator. The reflective properties are thus adjustable.

The heated-up transparent liquid in the solar collector can be used as a heat-transfer medium, that is to say the heated transparent liquid can, for example, be collected in a storage vessel and subsequently be used for heating spaces and/or tap water.

In one embodiment, the absorbing layer is provided with ducts for a heat-transfer fluid. Instead of using the transparent liquid in the duct directly for heating, this liquid may be in heat-exchanging contact with a heat-transfer fluid in the ducts of the absorbing layer. The heat-transfer fluid, such as water, is then, for example, collected in a storage vessel and subsequently used as warm tap water or in a heating installation.

As the transparent liquid in the duct is in this case separate from the heat-transfer fluid in the absorbing layer, the transparent liquid in the duct can be modified in order to produce the desired properties for reflecting light and allowing light to pass through, in combination with the material of the regulating layer.

The features of the dependent claims with regard to the reflecting device can also be applied to the solar collector according to the invention.

The invention also relates to a pitched roof comprising a solar collector as described above, in which the first and/or second structure is provided with elongate ridges which are prismatic in cross section. Said ridges extend, for example, in the direction of the pitch of the roof. As a result thereof, the sun's altitude has only a minimal effect, that is to say the efficiency of the solar collector hardly depends on the season, if at all. The reflection does, however, vary according to the time of day—at 12 o'clock (noon), the incident solar energy is at a maximum and the solar collector without the transparent fluid in the fluid duct reflects the sunlight virtually completely.

In order to give the solar collector an attractive appearance, the solar collector may, for example, be in the form of a roof tile. As a result, the solar collector can be discreetly incorporated into the pitched roof.

The invention furthermore relates to a greenhouse comprising a reflecting device as described above. In particular, the greenhouse has columns, beams supported by the columns, as well as a roof structure supported by the beams, which roof structure is provided with a transparent first wall, a transparent second wall, which is arranged substantially parallel to and at a distance from the first wall, a transparent third wall, which is arranged substantially parallel to and at a distance from the second wall, and a first regulating layer, which is provided with a first duct, which is bounded between the first wall and the second wall, and which first regulating layer substantially allows light incident on the first wall through to the second wall if the first duct is filled with a transparent liquid and reflects light incident on the first wall if the first duct is empty, the first regulating layer being provided with a first structure which is prismatic in cross section, and a second regulating layer, which is provided with a second duct, which is bounded between the second wall and the third wall, the second regulating layer being provided with a second structure which is prismatic in cross section. For example, the first structure delimits the first duct on a side of the first duct which extends parallel to the first wall and second wall. The second structure may delimit the second duct on a side of the second duct which extends parallel to the second wall and third wall.

The roof structure comprises three walls, namely an inner wall, an outer wall and an intermediate wall situated in between. The liquid ducts are provided between the outer wall and the intermediate wall, and between the intermediate wall and the inner wall, respectively.

The features of the dependent claims with respect to the reflecting device can also be applied with the greenhouse according to the invention.

In one embodiment, the first wall forms an outer wall of the roof structure, which outer wall is provided with an outer side for receiving sunlight which impinges on the roof structure and an opposite inner side, in which the first structure of the first regulating layer is provided on the inner side of the outer wall, and in which the second wall is situated on the inner side of the outer wall. As a result thereof, the amount of sunlight which is allowed into the greenhouse can be adjusted.

However, it is also possible for the first wall to form an inner wall of the roof structure, which inner wall is provided with an inner side which is situated adjacent to an interior of the greenhouse, and an opposite outer side, in which the first structure of the first regulating layer is provided on the outer side of the inner wall, and in which the second wall is situated on the outer side of the inner wall. As a result thereof, the roof structure of the greenhouse can prevent light from emerging from the greenhouse to the outside. By filling the duct, the light pollution which is caused by the greenhouse is reduced.

The second structure of the second regulating layer may be provided on the second wall, on that side thereof which is turned towards the third wall. In this case, the two prismatic structures of the two regulating layers are turned in the same direction. If the prismatic cross-sectional structures are designed as elongate ridges, the ridges of the one prismatic structure may extend at an angle with respect to the ridges of the other prismatic structure. This may affect the reflective properties of the roof structure of the greenhouse in a positive manner.

In one embodiment, the second structure of the second regulating layer is provided on the third wall, on that side thereof which is turned towards the second wall. The outer wall and the inner wall are each provided with a prismatic structure. These prismatic structures are turned towards one another. Between the prismatic structures, there is an intermediate wall, which is, for example, designed to be substantially smooth on both sides. This embodiment can allow light incident on the roof structure through or reflect it and can allow light produced in the greenhouse through or reflect it by filling or emptying the respective liquid ducts.

In addition, the invention relates to a reflecting device for reflecting light, such as sunlight, comprising a transparent first wall, a transparent second wall, which is arranged substantially parallel to and at a distance from the first wall, and a duct, which is bounded between the first wall and the second wall, in which the first wall is provided with a first structure which is prismatic in cross section, and which first structure delimits the duct on a side of the duct which extends parallel to the first wall and second wall, and in which a second structure is provided which is prismatic in cross section, in which said second structure is provided on that side of the second wall which is turned away from the duct. In this case, the third wall is omitted.

The two transparent walls are each provided with a structure which is prismatic in cross section. The prismatic cross-sectional first and second structures extend in two planes which are substantially parallel to one another. When, due to the angle of incidence, light is allowed through the prismatic cross-sectional first structure of the first wall, the prismatic cross-sectional second structure of the second wall can still reflect this light which has passed through. This embodiment also has two prismatic structures which are arranged one above the other. The prismatic structures are, for example, both directed downwards. When passing through the upper structure, the angle of incidence changes. The lower structure can refract the light rays which have been allowed through by the upper structure. The reflective properties are excellent, both when the light rays impinge at right angles and at an angle. A reflecting device of this type can, for example, be integrated into a greenhouse in order to continually reflect as much sunlight as possible. The duct does not have to be filled with liquid.

With this embodiment, the first wall and the second wall may be fixed with respect to one another. As a result thereof, a strong and reliable structure is produced.

The invention will now be explained in more detail with reference to the attached drawing, in which.

Figure 1:
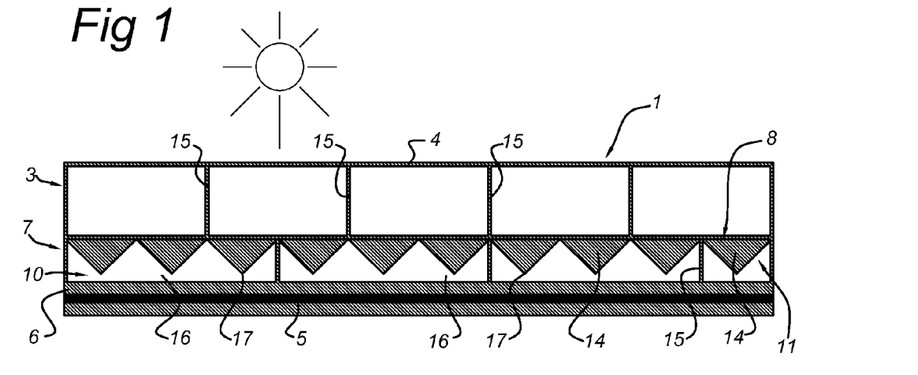
FIG. 1 shows a cross-sectional view of a first embodiment of a reflecting device according to the invention.

FIG. 1 shows a reflecting device 1 which can also be used as a solar collector. The reflecting device 1 comprises a duct 10, which is bounded by two walls 3,5, which are arranged substantially parallel to and at a distance from one another. The first wall 3 forms a transparent layer or panel 3 for receiving sunlight. In this exemplary embodiment, the second wall 5 forms an absorbing layer for absorbing solar energy. The absorbing layer 5 forms a so-called absorber plate and is usually coloured black.

The transparent first wall 3 has a cover plate 4, which defines the outer side of the reflecting device 1 which is turned towards the sun, and a carrier plate 6. In this exemplary embodiment, the cover plate 4 is arranged at a distance from the carrier plate 6 by means of dividing walls 15. However, the dividing walls 15 can also be omitted (not shown). It is also possible for the transparent first wall 3 to be solid (not shown). Air or another gas or a vacuum is for example present between the cover plate 4 and the upper surface 8 of the carrier plate 6, so that the transparent first wall 3 forms an insulating layer.

On the opposite side of the carrier plate 6, that is to say on that side of the transparent first wall 3 which is turned away from the sunlight, a structure 11 is provided which is prismatic in cross section. The prismatic cross-sectional structure 11 and the duct 10 form a regulating layer 7 for regulating the reflection of sunlight.

The prismatic structure 11 is designed such that light rays incident at right angles are reflected by total reflection. The two angles between the surface of the prismatic structure which receives the incident light and the reflecting surfaces of the prismatic structure are greater than the critical angle of the material of the prismatic structure. The critical angle θ for total reflection is determined by sin θ=1/n, with n being the refractive index of the material.

In this exemplary embodiment, the prismatic structure 11 is formed by elongate ridges 14, which are turned towards the absorbing layer 5. The ridges 14 extend substantially straight along the bottom surface of prismatic structure 11. Viewed in cross section, the ridges 14 are prismatic, that is to say in cross section each of the ridges 14 defines a triangle. If the solar collector 1 is placed on a pitched roof, the ridges 14 extend in the direction of inclination of the roof.

Each of the ridges 14 comprises a tip 17 which is directed towards the absorbing layer 5. The ridges 14 are arranged at a distance from the absorbing layer 5. Between the ridges 14 and the absorbing layer 5, a duct 10 is formed. The prismatic structure of the regulating layer 7 delimits the duct 10. During normal use, the duct 10 is filled with a transparent liquid 9. The refractive index of the transparent liquid 9 is preferably substantially identical to the refractive index of the material of the prismatic structure of the regulating layer 7. This is, however, not imperative in order for the regulating layer 7 to function.

In this exemplary embodiment, one or more ridges 14 are bounded between further dividing walls 15, which extend in the longitudinal direction in between. As a result, the duct 10 is divided into partial ducts 16. The dividing walls 15 between the ridges 14 and the absorbing layer 5 are optional.

Figures 2A, 2B:
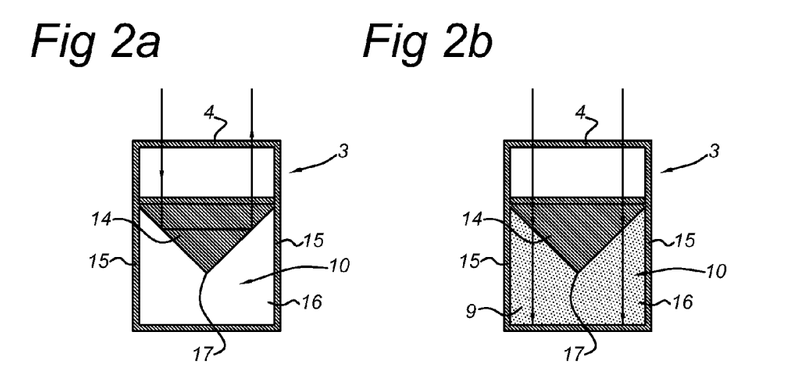
FIG. 2a shows how a light ray is reflected by the prismatic structure of the reflecting device shown in FIG. 1.
FIG. 2b shows how a light ray passes through the prismatic structure of the reflecting device shown in FIG. 1.

The operation of the regulating layer 7 is illustrated in FIGS. 2a and 2b. If the duct 10 is filled with the transparent liquid 9, the incident light rays can pass through the ridge 14 (see FIG. 2b). The incident sunlight heats the absorbing layer 5, as a result of which the temperature rises. When the evaporation temperature of the transparent liquid is exceeded, the latter evaporates from the duct 10. The ridge 14 then forms a transition between the material of the regulating layer 7 and the air which is present in the duct 10. A light ray which impinges perpendicularly from above is then reflected on the surfaces of the ridge 14 (see FIG. 2a). Switching between allowing through and reflecting is also possible by deliberately removing the transparent liquid from the duct 10.

Figure 3:
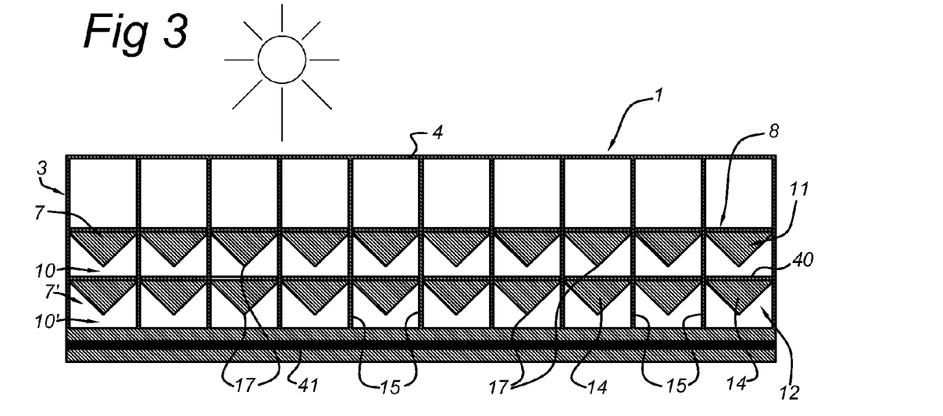
FIG. 3 shows a cross-sectional view of a second embodiment of a reflecting device according to the invention.

FIG. 3 shows a second embodiment of the reflecting device of solar collector 1 according to the invention, in which the same or similar parts are denoted by the same reference numerals. The embodiment shown in FIG. 3 has two regulating layers 7, each of which is provided with a duct 10 and a structure 11,12 which is prismatic in cross section. Each of the liquid ducts 10 is bounded by two walls 3,40 and 40,41, respectively, which are arranged substantially parallel to and at a distance from one another. The reflecting device comprises three walls 3,40,41. In this exemplary embodiment, each prismatic structure 11,12 has elongate ridges 14 which are turned away from the sunlight.

The first prismatic structure 11 is provided on that side of the transparent first wall 3 which is turned away from the sunlight, while the second prismatic structure 12 is provided on that side of the central second wall 40 which is turned away from the sunlight. In this exemplary embodiment, the third wall 41 is designed as an absorbing layer for absorbing solar energy—similar to the absorbing layer 5 from FIG. 1. The liquid ducts 10 for receiving transparent liquid are situated between the ridges 14 of the lower structure 12 and the absorbing layer 41, and between the ridges 14 of the upper structure 11 and the upper surface of the lower structure 12, respectively.

In this exemplary embodiment, the tips 17 of the ridges 14 of the prismatic structures 11,12 are aligned with respect to one another. However, the tips 17 may also be offset with respect to one another (not shown).

Figure 4:
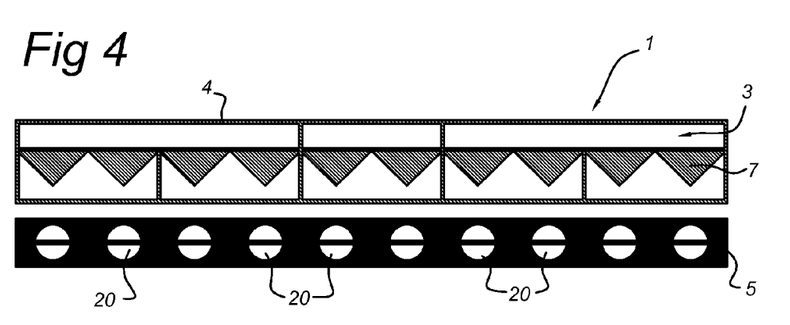
FIG. 4 shows a cross-sectional view of a third embodiment of a reflecting device according to the invention.

FIG. 4 shows a third embodiment of the reflecting device of solar collector 1 according to the invention, in which the same or similar parts are denoted by the same reference numerals. The absorbing layer 5 is provided with internal ducts 20 for receiving a heat-transfer fluid. The transparent liquid in the duct 10 is in this case separated from the heat-transfer fluid.

The parts of the reflecting device or solar collector 1 may be made of plastic, such as polycarbonate. As a result thereof, the production costs are relatively low, in particular if extrusion is used.

Figure 5:
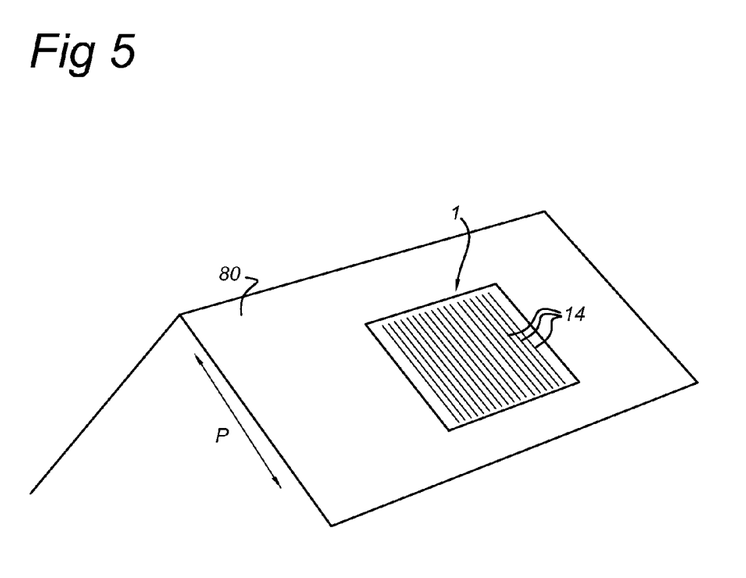
FIG. 5 shows a pitched roof, which is provided with a reflecting device according to the invention.

FIG. 5 diagrammatically shows a pitched roof 80, which is provided with a reflecting device or solar collector 1 as described above. The elongate ridges 14 of the prismatic structure extend in the direction of inclination of the roof, which is indicated by arrow P. As a result, the influence of the sun's altitude is minimal, that is to say the efficiency of the solar collector hardly depends on the season, if at all. The reflectivity does however vary according to the time of day.

Figure 6:
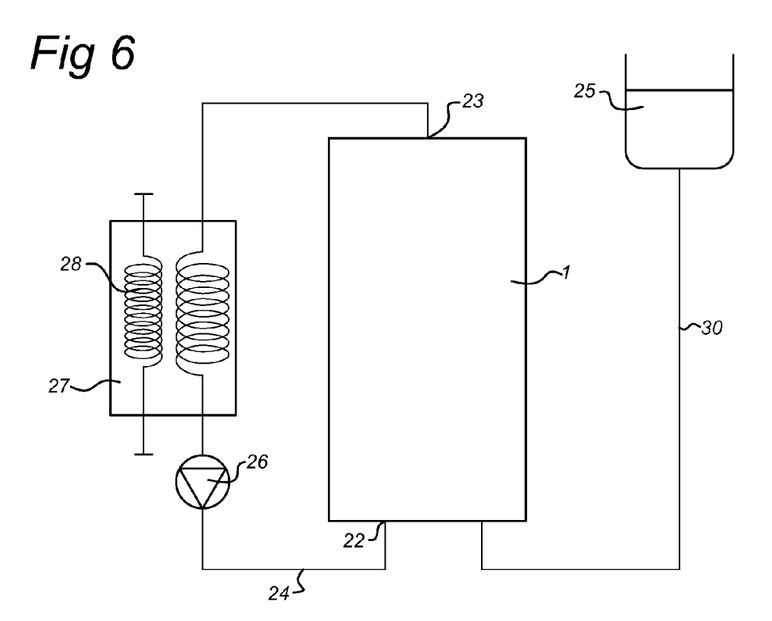
FIG. 6 diagrammatically shows a heat system comprising a solar collector according to the invention.

FIG. 6 diagrammatically shows a heat system for converting solar energy into heat. The heat system comprises a solar collector 1, which is, for example, designed as described above. The solar collector 1 has a fluid inlet 22 and a fluid outlet 23 for supplying and discharging the transparent fluid, respectively. The fluid inlet 22 and the fluid outlet 23 are connected to one another outside the solar collector 1 by means of a circulation line 24.

The circulation line 24 extends through a heat exchanger 27. The heat exchanger 27 has a heat-absorbing line 28 which is in heat-exchanging contact with the circulation line 24 in the heat exchanger 27. Incidentally, the transparent liquid from the duct can, if desired, be used directly without the use of a heat exchanger (not shown). In this exemplary embodiment, a circulation pump 26 is incorporated in the circulation line 24. However, the circulation can also be effected by means of natural convection, that is to say that the circulation pump is then superfluous.

An open reservoir 25 is connected to the solar collector 1 via a line 30. The open reservoir 25 and the line 30 are filled with the transparent fluid 9. When the transparent fluid 9 evaporates and condenses, the level in the open reservoir 25 changes. It is possible to use a different system for compensating for the pressure difference instead of an open reservoir, such as a closed reservoir or expansion vessel.

Figure 7:
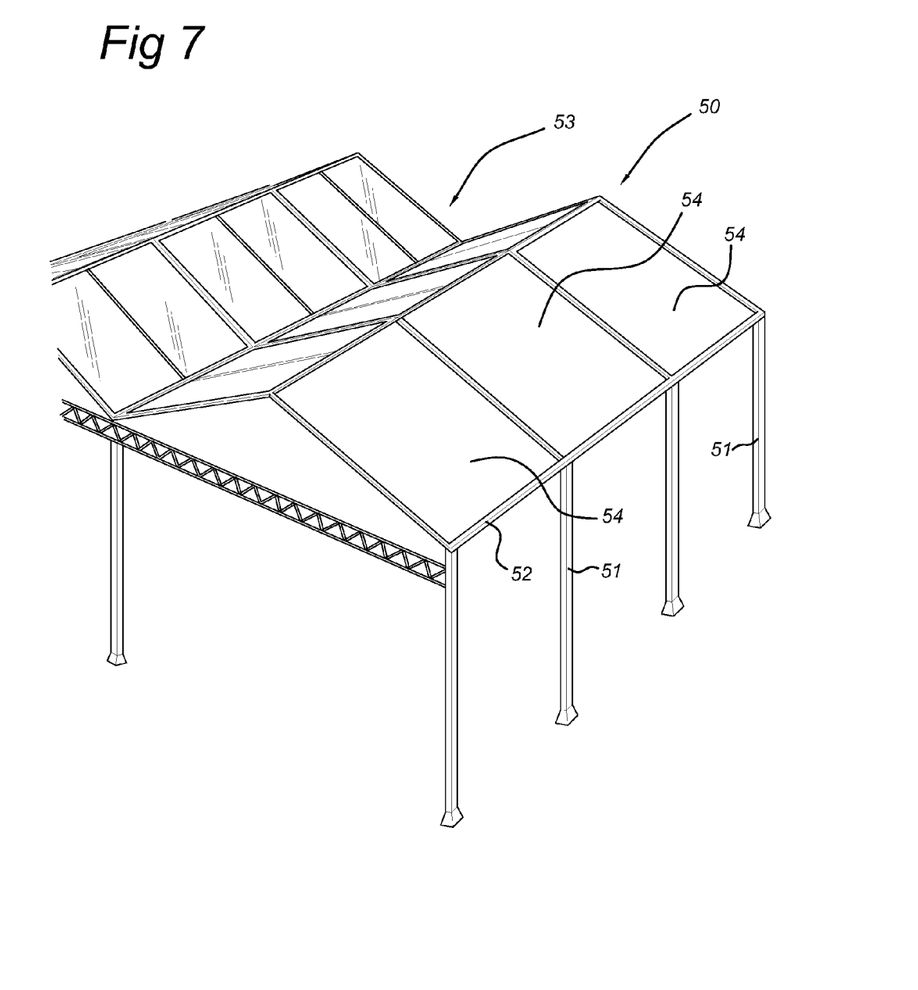
FIG. 7 shows a perspective view of a greenhouse.

FIG. 7 shows a greenhouse 50 to be used for cultivation under glass. The greenhouse 50 comprises a series of columns 51 and beams 52 which are supported by the columns 51. The beams 52 support a roof structure 53. The roof structure 53 comprises panels 54. The panels 54 are, for example, designed as shown in FIGS. 8a-d, in which the same or similar parts are denoted by the same reference numerals.

Figure 8A:
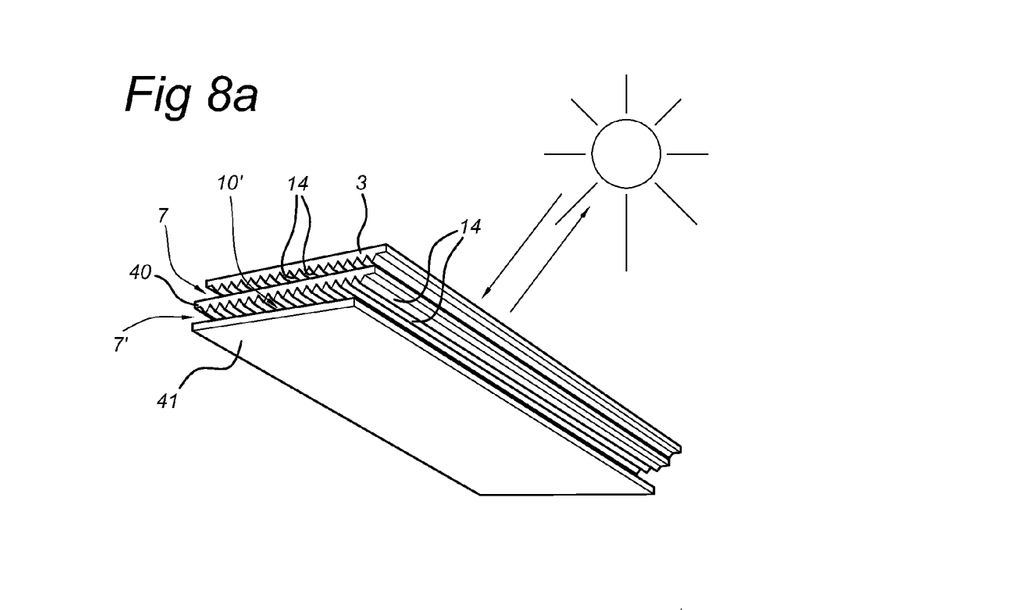
FIG. 8a shows a fourth embodiment of a reflecting device according to the invention for use with the greenhouse shown in FIG. 7.
Figure 8B:
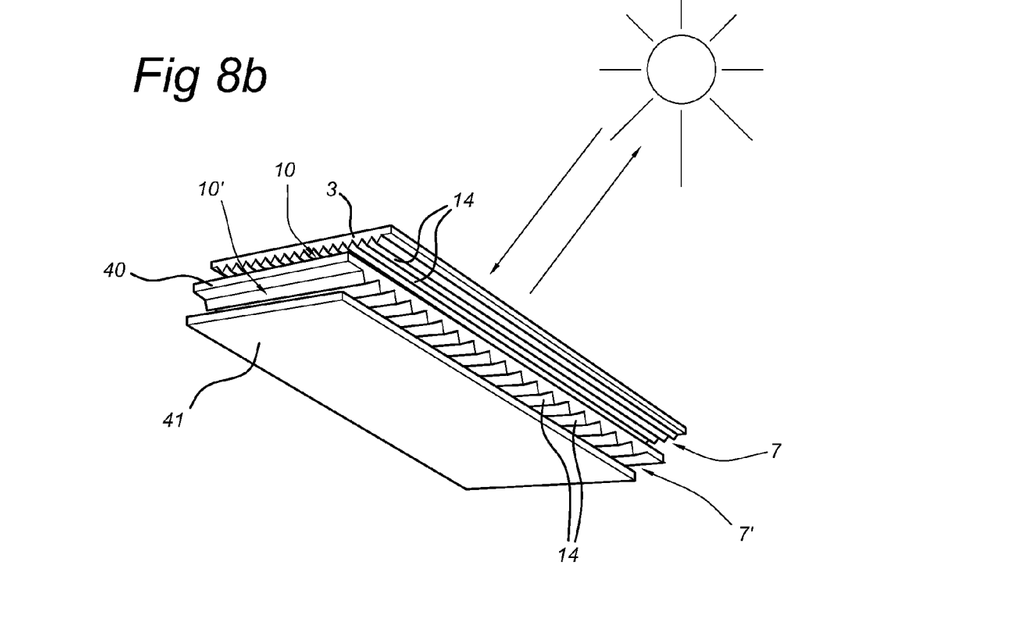
FIG. 8b shows a fifth embodiment of a reflecting device according to the invention for use with the greenhouse shown in FIG. 7.

The panels of the roof structure 53 shown in FIGS. 8a-d have a triple-walled structure, that is to say each panel of the roof structure 53 is composed of three walls 3,40,41. The embodiments shown in FIGS. 8a, 8b are suitable for switching the sunlight which is incident on the roof structure 53. In FIG. 8a, the elongate ridges 14 of the prismatic structures 11, 12 are aligned with respect to one another. FIG. 8b shows an embodiment with elongate ridges 14 of two regulating layers 7,7', which run substantially at right angles to one another.

Figure 8C:
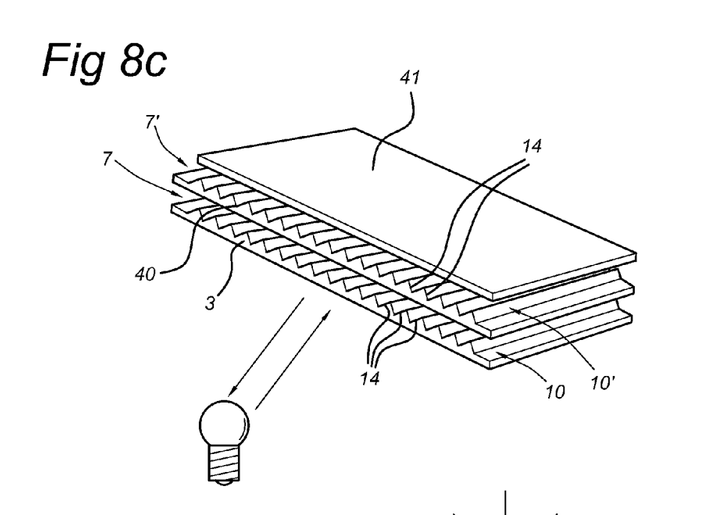
FIG. 8c shows a sixth embodiment of a reflecting device according to the invention for use with the greenhouse shown in FIG. 7.
Figure 8D:
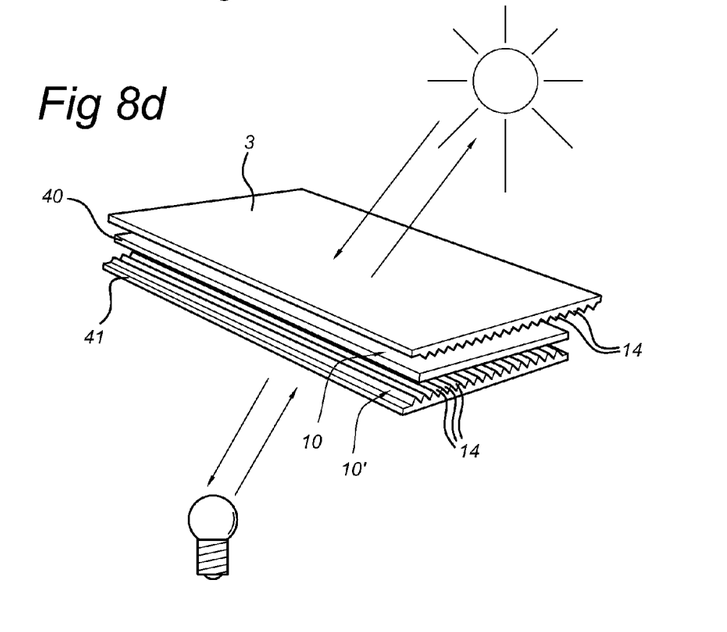
FIG. 8d shows a seventh embodiment of a reflecting device according to the invention for use with the greenhouse shown in FIG. 7.

In FIG. 8c, the reflecting device according to the invention is used to keep the light produced in the greenhouse 50 inside the greenhouse 50, so that the light pollution caused by the greenhouse 50 is reduced. The embodiment from FIG. 8d is adapted to be able to regulate the allowing through and reflecting of both the sunlight and the light produced in the greenhouse. With the embodiments shown in FIGS. 8a, 8b and 8d, the elongate ridges of the transparent outer wall 3 extend in the direction of inclination of the roof structure 53.

The liquid which flows through the liquid ducts 10,10' of the roof structure 53 can be used to cool the roof structure 53. The liquid can also be used for producing heat. The reflecting device which is integrated into the roof structure 53 then also acts as a solar collector. The embodiments illustrated in FIGS. 8a-8d are incidentally also suitable as reflecting device for uses other than in a greenhouse.

Obviously, the invention is not limited to the exemplary embodiments illustrated in the figures. Those skilled in the art can make various modifications which are within the scope of the invention. For example, the reflecting device is not only suitable for a solar collector, but also for a solar cell or other applications, where it is desirable to limit the incoming solar energy when a maximum temperature has been exceeded. Also, the reflecting device according to the invention is not limited to applications involving sunlight—the reflecting device is also suitable for regulating the reflection of light from other sources of light.

The invention claimed is:

1. A reflecting device for adjustably reflecting light, such as sunlight, comprising a transparent first wall, a transparent second wall, which is arranged substantially parallel to and at a distance from the first wall, and a regulating layer, which is provided with a duct, which is bounded between the first wall and the second wall, and which regulating layer substantially allows light which impinges on the first wall through to the second wall if the duct is filled with a transparent liquid and reflects light which impinges on the first wall if the duct is empty, the regulating layer being provided with a structure which is prismatic in cross section, characterized in that, the reflecting device is provided with a third wall, which is arranged substantially parallel to and at a distance from the second wall, and a second regulating layer, which is provided with a second duct, which is bounded between the second wall and the third wall, the second regulating layer being provided with a second structure which is prismatic in cross section.

2. The reflecting device according to claim 1, in which the structure delimits the duct on a side of the duct which extends parallel to the first wall and second wall.

3. The reflecting device according to claim 1, in which the second structure delimits the second duct on a side of the second duct which extends parallel to the second wall and third wall.

4. The reflecting device according to claim 1, in which the first wall and the second wall and the third wall are fixed with respect to one another.

5. The reflecting device according to claim 1 in which the duct is provided with a transparent liquid which is in contact with the structure being prismatic in cross-section for substantially allowing light through the regulating layer, and in which the transparent liquid can evaporate from the duct by heating for substantially reflecting light by the structure being prismatic in cross-section of the regulating layer.

6. The reflecting device according to claim 1, in which the second duct is provided with a transparent liquid which is in contact with the second structure being prismatic in cross-section for substantially allowing light through the second regulating layer, and in which the transparent liquid can evaporate from the second duct by heating for substantially reflecting light by the second structure being prismatic in cross-section of the second regulating layer.

7. The reflecting device according to claim 1, in which the structure being prismatic in cross-section is provided on the first wall, on that side thereof which is turned towards the second wall.

8. The reflecting device according to claim 1, in which the structure being prismatic in cross-section is provided on the second wall, on that side thereof which is turned towards the third wall.

9. The reflecting device according to claim 1, in which the second structure being prismatic in cross-section is provided on the third wall, on that side thereof which is turned towards the second wall.

10. The reflecting device according to claim 1, in which the third wall is provided with an absorbing layer.

11. The reflecting device according to claim 1, in which the third wall is transparent.

12. The reflecting device according to claim 1, in which the first structure and the second structure are each provided with elongate ridges which are prismatic in cross section.

13. The reflecting device according to claim 12, in which the ridges each comprise a tip, and in which the tips of the ridges of the first structure are offset with respect to the tips of the ridges of the second structure.

14. The reflecting device according to claim 11, in which the ridges of the first structure and the ridges of the second structure extend at an angle to one another.

15. The reflecting device according to claim 1, in which the transparent first wall and/or the transparent second wall and/ or the third wall and/or the regulating layer and/or the second regulating layer comprise plastic, for example polycarbonate.

16. A solar collector for converting solar energy into heat, comprising a reflecting device according to claim 1, in which the third wall is provided with a layer which absorbs solar energy.

17. A pitched roof comprising a solar collector according to claim 16.

18. A greenhouse comprising columns, beams supported by the columns, as well as a roof structure supported by the beams, which roof structure is provided with the reflecting device according to claim 1, in which the third wall is transparent.

19. The greenhouse according to claim 18, in which the first wall forms an outer wall of the roof structure, which outer wall is provided with an outer side for receiving sunlight which impinges on the roof structure and an opposite inner side, in which the first structure of the first regulating layer is provided on the inner side of the outer wall, and in which the second wall is situated on the inner side of the outer wall.

20. The greenhouse according to claim 18, in which the first wall forms an inner wall of the roof structure, which inner wall is provided with an inner side which is situated adjacent to an interior of the greenhouse, and an opposite outer side, in which the first structure of the first regulating layer is provided on the outer side of the inner wall, and in which the second wall is situated on the outer side of the inner wall.

21. A greenhouse according to claim 18, in which the second structure of the second regulating layer is provided on the second wall, on that side thereof which is turned towards the third wall.

22. A greenhouse according to claim 18, in which the second structure of the second regulating layer is provided on the third wall, on that side thereof which is turned towards the second wall.

23. A reflecting device for reflecting light, such as sunlight, comprising a transparent first wall, a transparent second wall, which is arranged substantially parallel to and at a distance from the first wall, and a duct, which is bounded between the first wall and the second wall, in which the first wall is provided with a first structure which is prismatic in cross section, and which first structure delimits the duct on a side of the duct which extends parallel to the first wall and second wall, and in which a second structure is provided which is prismatic in cross section, characterized in that said second structure is provided on that side of the second wall which is turned away from the duct.

24. The reflecting device according to claim 23, in which the first wall and the second wall are fixed with respect to one another.

25. A greenhouse comprising a reflecting device according to claim 23.

* * * * *